US008520087B2

(12) United States Patent
Toyoda (10) Patent No.: US 8,520,087 B2
(45) Date of Patent: Aug. 27, 2013

(54) IMAGE CAPTURING DEVICE

(75) Inventor: Takafumi Toyoda, Chigasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/108,499

(22) Filed: May 16, 2011

(65) Prior Publication Data

US 2011/0292228 A1 Dec. 1, 2011

(30) Foreign Application Priority Data

May 25, 2010 (JP) ................................. 2010-119423

(51) Int. Cl.
*H04N 5/225* (2006.01)

(52) U.S. Cl.
USPC ...................................................... 348/220.1

(58) Field of Classification Search
USPC ...................................................... 348/220.1
See application file for complete search history.

(56) References Cited

U.S. PATENT DOCUMENTS

| 7,705,889 B2 * | 4/2010 | Tabatabai et al. | ......... 348/220.1 |
| 2002/0001035 A1 * | 1/2002 | Haneda | ........................ 348/220 |
| 2009/0051515 A1 * | 2/2009 | Fujinawa et al. | ............. 340/436 |
| 2009/0290035 A1 * | 11/2009 | Hosoda | ..................... 348/220.1 |

FOREIGN PATENT DOCUMENTS

| JP | 2001-111934 | * | 4/2001 |
| JP | A-2001-111934 | | 4/2001 |
| JP | A-2007-159088 | | 6/2007 |

OTHER PUBLICATIONS

English translation of JP-2001-111934 Apr. 2001 Inoue Akira.*
Mar. 27, 2012 Office Action issued in Japanese Patent Application No. 2010-119423 (with translation).

* cited by examiner

*Primary Examiner* — James Hannett
(74) *Attorney, Agent, or Firm* — Oliff & Berridge, PLC (57) ABSTRACT

An image capturing device includes a first image processing unit that processes a plurality of frame images to form a moving image file, on the basis of an image capturing signal from an image capturing element that captures an image of light from a subject, an instructing unit that instructs to capture a still image of the subject, a second image processing unit that processes the still image on the basis of the image capturing signal from the image capturing element, when the instructing unit instructs to capture the still image during capturing of the moving image, and generates an interpolation frame image that is the frame image until the capturing of the moving image restarts after the instructing unit instructs to capture the still image, when the capturing of the moving image restarts after the still image is captured, and a moving image file generating unit that generates the moving image file, on the basis of the plurality of frame images processed by the first image processing unit and the interpolation frame image generated by the second image processing unit.

10 Claims, 9 Drawing Sheets

IMAGE CAPTURING DEVICE

CROSS-REFERENCE TO RELATED APPLICATION

The disclosure of the following priority application is herein incorporated by reference:

Japanese Patent Application No. 2010-119423 filed on May 25, 2010.

TECHNICAL FIELD

The present invention relates to an image capturing device that captures a still image during capturing of a moving image.

BACKGROUND ART

There is suggested an image capturing device that interrupts a moving image capturing/recording process according to a still image capturing/recording instruction given during capturing and recording of a moving image, and starts counting of the number of missing moving image frames (missing frames) during a still image capturing/recording process. Then the image capturing device stores still image data generated on the basis of an image capturing signal from an image capturing element in a memory card, and generates pseudo moving image frames (pseudo frames) from the still image data. Furthermore, the image capturing device adds the generated pseudo frames to the moving image data of the interrupted moving image, restarts the moving image capturing/recording process, and adjusts an offset such that the pseudo frames are applied to the counted missing frames (for example, see Patent Literature 1).

CITATION LIST

Patent Literature

Patent Literature 1: Japanese Patent Laid-open Application Publication No. 2007-159088

SUMMARY OF INVENTION

Technical Problem

In the image capturing device disclosed in Japanese Patent Application Laid-Open No. 2007-159088, one pseudo moving image frame (pseudo frame) is generated from one still image data, and the pseudo frames are applied to the plural missing frames during the still image capturing/recording process. In another image capturing device according to the related art, moving image frames immediately before a still image capturing/recording process starts are applied to plural missing frames. Therefore, when the moving image is reproduced, movement of a subject of a portion that corresponds to the plural missing frames is unnaturally stopped.

The pseudo frames can be generated on the basis of the movement of the subject during the still image capturing/recording process. However, a pseudo frame generating process needs to be executed after the moving image is captured and a memory that has the large capacity is needed to store a large number of frame images.

It is an object of the present invention to provide an image capturing device that can capture a still image during capturing of a moving image, restart capturing of the moving image, and then easily generate a frame image missed during capturing of the still image with high precision, during capturing of the moving image.

Solution to Problem

An image capturing device according to an embodiment of the present invention includes an image capturing element that captures an image of light from a subject, a first image processing unit that processes a plurality of frame images to form a moving image file, on the basis of an image capturing signal from the image capturing element, an instructing unit that instructs to capture a still image of the subject, a second image processing unit that processes the still image on the basis of the image capturing signal from the image capturing element, when the instructing unit instructs to capture the still image during capturing of the moving image, and generates an interpolation frame image to be the frame image until the capturing of the moving image restarts after the instructing unit instructs to capture the still image, when the capturing of the moving image restarts after the still image is captured, and a moving image file generating unit that generates the moving image file, on the basis of the plurality of frame images processed by the first image processing unit and the interpolation frame image generated by the second image processing unit.

Advantageous Effects of Invention

According to the image capturing device the present invention, after the capturing of moving image is interrupted for capturing of still image and then the capturing of moving image restarts, the missing frame image during capturing of the still image can be easily generated with high precision during the capturing moving image that restarted.

DESCRIPTION OF EMBODIMENTS

Figure 1:
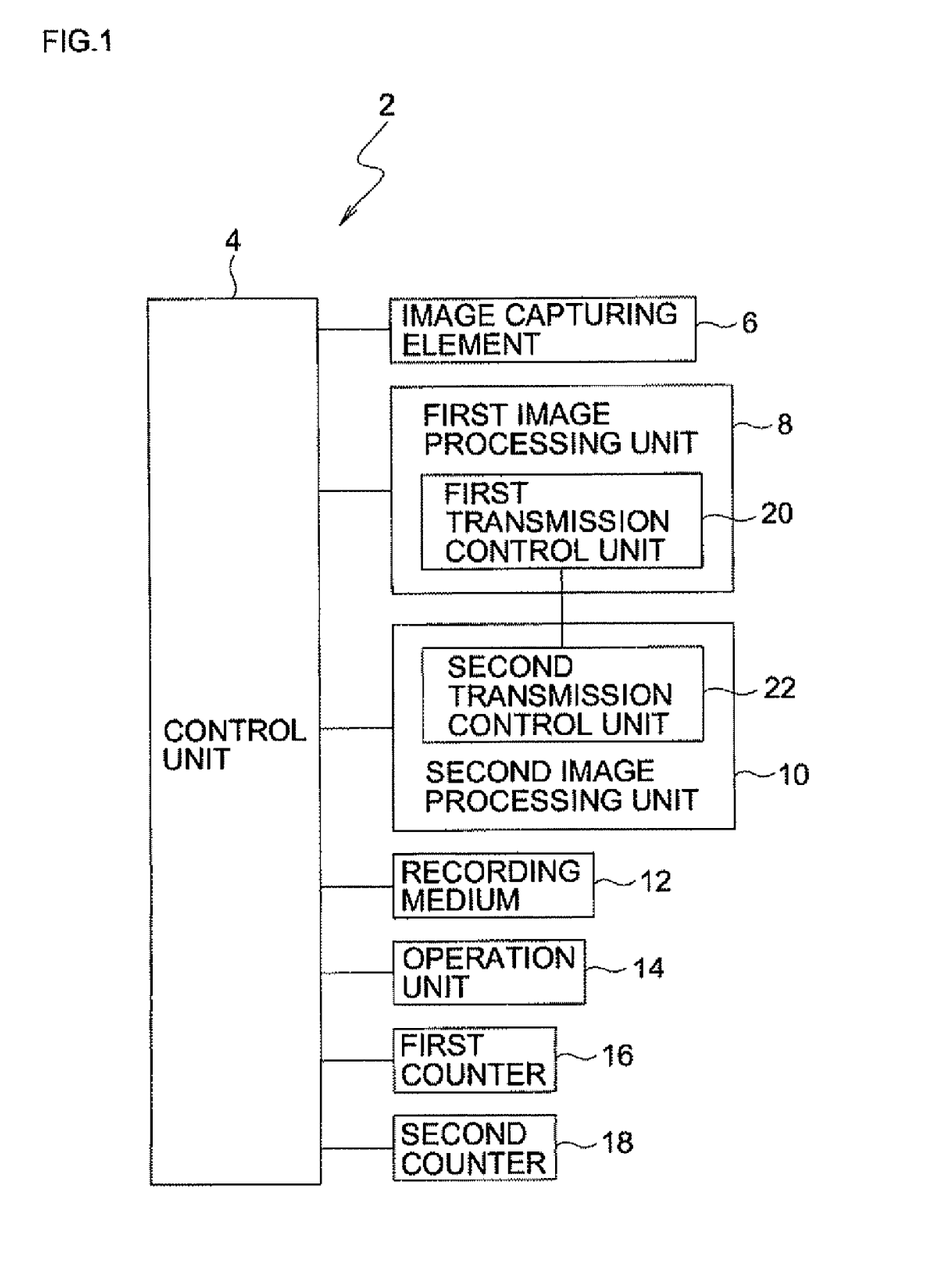
FIG. 1 is a block diagram illustrating the system configuration of an electronic camera according to an embodiment.

Hereinafter, an electronic camera that functions as an image capturing device according to an embodiment of the present invention will be described with reference to the drawings. FIG. 1 is a block diagram illustrating the system configuration of an electronic camera 2 according to an embodiment. As illustrated in FIG. 1, the electronic camera 2 includes a control unit 4 that includes a microprocessor and wholly controls individual units of the electronic camera 2. The control unit 4 is connected to an image capturing element 6, a first image processing unit 8, a second image processing unit 10, a storage medium 12, an operation unit 14, a first counter 16, and a second counter 18. The image capturing element 6 includes a CCD or a CMOS and captures an image of light from a subject through a photographic lens (not illustrated). The control unit 4 acquires image data based on an image capturing signal that is output from the image capturing element 6 and is converted from an analog signal to a digital signal by an A/D converter (not illustrated).

The first image processing unit 8 and the second image processing unit 10 execute processing of plural frame images to form a moving image file, processing of still images, and generation processing of interpolation frame images (to be described below), on the basis of the image data based on the image capturing signal from the image capturing element 6. The first image processing unit 8 includes a first transmission control unit 20, which transmits the image or the like processed by the first image processing unit 8 to the second image processing unit 10 through a second transmission control unit 22, described below, and receives the image or the like (image processed by the second image processing unit 10) transmitted by the second image processing unit 10 through the second transmission control unit 22. Likewise, the second image processing unit 10 includes the second transmission control unit 22, and the second transmission control unit 22 transmits the image or the like processed by the second image processing unit 10 to the first image processing unit 8 through the first transmission control unit 20 and receives the image or the like transmitted by the first image processing unit 8 through the first transmission control unit 20.

The recording medium 12 is a recording medium having portability that is separately mounted in a card slot (not illustrated) provided in the electronic camera 2, and image files of still images and moving images are recorded in the recording medium 12. The operation unit 14 includes a power supply switch for turning on/off a power supply, a release button for instructing to capture a still image, a recording button for instructing to start or end recording of a moving image, and a mode button for selecting an image capture mode. The first counter 16 counts the number of frame images constituting a moving image file during a period until an image capturing signal to generate a still image is read from the image capturing element 6 after capturing of the still image is instructed during capturing of the moving image. The second counter 18 counts the number of frame images constituting a moving image file during a period until capturing of the moving image restarts after an image capturing signal to generate a still image is read from the image capturing element 6 during capturing of the moving image.

In the electronic camera 2 according to the embodiment, when the moving image is captured, processing of frame images to form the moving image file is executed by the first image processing unit 8 (or the second image processing unit 10). If the release button is pressed during capturing of the moving image, capturing of the moving image, that is, processing of the frame images by the first image processing unit 8 (or the second image processing unit 10) is interrupted and capturing of the still image, that is, processing of the still image by the second image processing unit (or the first image processing unit 8) is executed. If capturing of the still image ends, capturing of the moving image restarts. At this time, the first image processing unit 8 (or the second image processing unit 10) restarts moving image processing of the frame image to form the moving image. At the same time as the restarting of the moving image processing by the first image processing unit 8, the second image processing unit 10 (or the first image processing unit 8) starts generation processing of the interpolation frame image that is the frame image of the moving image until capturing of the moving image restarts after the release button is pressed. Hereinafter, processing of when the moving image is captured in the electronic camera 2 according to the embodiment will be described with reference to a flowchart illustrated in FIG. 2 and a time chart illustrated in FIG. 3.

First, if the recording button is pressed by a user and a capturing start of the moving image is instructed (step S10), the control unit 4 resets a count value i of the first counter 16 and a count value j of the second counter 18 (i=0, j=0) (step S11).

Figure 3:
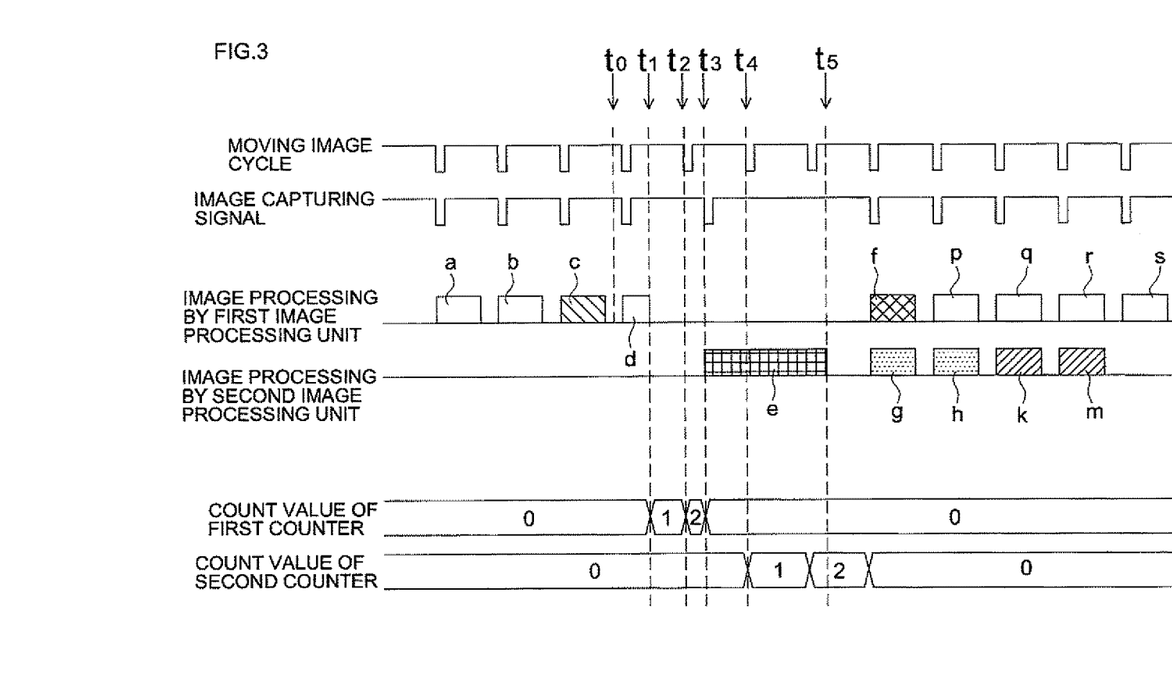
FIG. 3 is a time chart illustrating processing of when a moving image and a still image are captured in the electronic camera according to the embodiment.

Next, as illustrated in FIG. 3, the control unit 4 acquires image data based on an image capturing signal output from the image capturing element 6 in synchronization with a moving image cycle (for example, 30 fps or 60 fps) (step S12). Since the image data is image data for frame images to form the moving image file, not all pixels are read but pixels are selectively read from the image capturing element 6.

The first image processing unit 8 executes moving image processing of the image data acquired in step S12 (step S13). That is, the first image processing unit 8 executes moving image processing to generate one frame image of the plural frame images forming the moving image, from the image data based on the image capturing signal from the image capturing element 6, according to an instruction from the control unit 4. The control unit 4 temporarily stores the frame image on which the moving image processing is executed by the first image processing unit 8 in step S13 in a buffer memory (not illustrated) in the first image processing unit 8.

Next, the control unit 4 acquires the count value i from the first counter 16 and the count value j from the second counter 18 and determines whether each of the count values i and j is 0 (step S14). When it is determined that each of the count values i and j is 0 in step S14 (step S14: YES), the control unit 4 records the frame image temporarily stored in the buffer memory, in the recording medium 12 (step S15).

Specifically, the control unit 4 records the frame image stored in the buffer memory, in an address (recording region to sequentially record each frame image forming a moving image file) having a predetermined address number (number needed to sequentially record each frame image forming the moving image file) in the moving image file installed in the recording medium 12. For example, the control unit 4 sequentially records the first frame image forming the moving image file in an address having an address number of 1 generated according to the data capacity of the first frame image, the second frame image in an address having an address number of 2 generated according to the data capacity of the second frame image, the n-th (n is a natural number) frame image a illustrated in FIG. 3 in an address having an address number of n generated according to the data capacity of the n-th frame image, and the (n+1)-th frame image b illustrated in FIG. 3 in an address having an address number of (n+1) generated according to the data capacity of the (n+1)-th frame image.

Next, the control unit 4 determines Whether the recording button is pressed by the user and an end of capturing of the moving image is instructed (step S16). When it is determined that the end of capturing of the moving image is not instructed in step S16 (step S16: NO), the control unit 4 returns to processing of step S12 and repeats processing of steps S12 to S16 until it is determined that the end of capturing of the moving image is instructed in step S16. That is, the control unit 4 sequentially acquires the image data based on the image capturing signal output from the image capturing element in synchronization with the moving image cycle in step S12, sequentially executes the moving image processing on the acquired image data by the first image processing unit 8 in step S13 to sequentially generate the frame images (for example, frame images a, b, c, . . . illustrated in FIG. 3), and sequentially records the generated frame images a, b, c, in the recording medium 12 in step S15.

Meanwhile, when capturing of the still image is instructed by the user while processing of steps S12 to S16 is repeated, the control unit 4 interrupts processing of steps S12 to S16 and executes capturing of the still image. Hereinafter, processing of when a still image is captured during capturing of a moving image in the electronic camera 2 according to the embodiment will be described with reference to the flowchart illustrated in FIG. 4.

Figure 2:
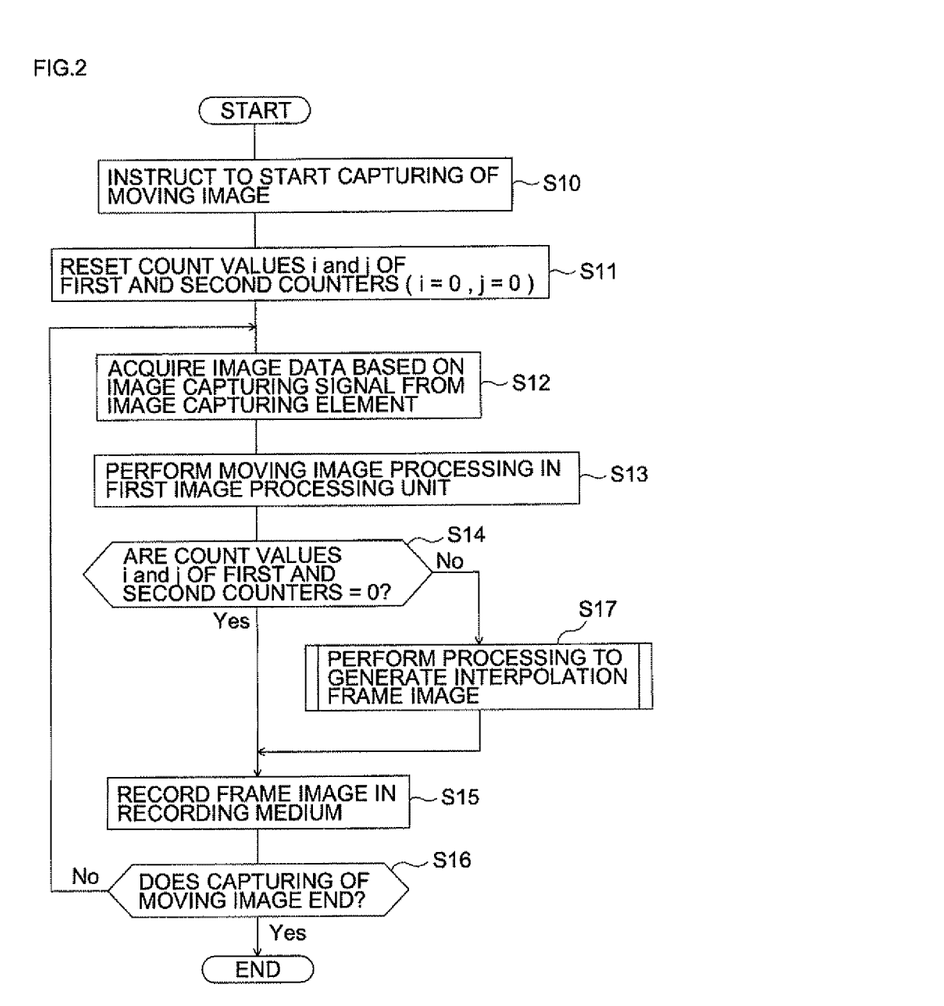
FIG. 2 is a flowchart illustrating processing of when a moving image is captured in the electronic camera according to the embodiment.
Figure 4:
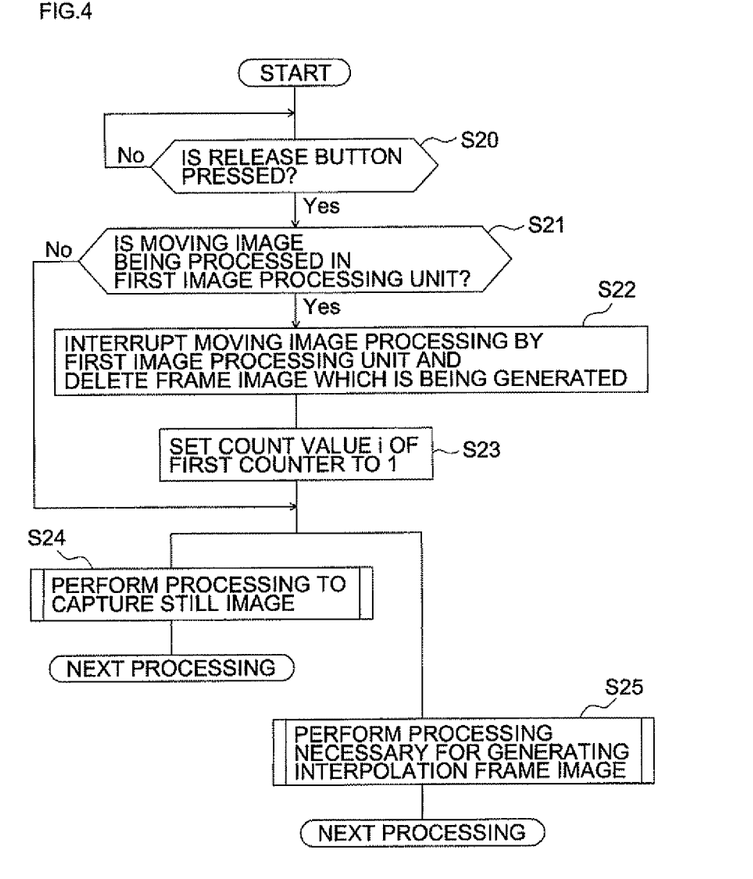
FIG. 4 is a flowchart illustrating processing of when capturing of a still image is instructed during capturing of a moving image in the electronic camera according to the embodiment.

First, when processing of steps S12 to S16 illustrated in FIG. 2 is executed, if the release button is pressed by the user (step S20: YES), the control unit 4 determines that the user instructs to start capturing of the still image and determines whether the moving image processing is being executed by the first image processing unit 8 in step S13 illustrated in FIG. 2 (step S21). That is, control unit 4 determines whether the first image processing unit 8 starts to generate the frame image by use of the image data based on the image capturing signal from the image capturing element 6 and the first image processing unit 8 does not end the generating the frame image.

When it is determined that the moving image processing is being executed by the first image processing unit 8 in step S21 (step S21: YES), the control unit 4 interrupts the moving image processing by the first image processing unit 8 and deletes the frame image that is being generated by the moving image processing by the first image processing unit 8 (step S22). For example, if the release button is pressed by the user at time t1 illustrated in FIG. 3, the control unit 4 interrupts the moving image processing of the frame image d by the first image processing unit 8 and deletes the frame image d. The control unit 4 sets, to one (1), the count value i of the first counter 16 for counting the number of frame images which would be generated if the moving image processing, which is supposed to be interrupted until the image data based on the image capturing signal output from the image capturing element 6 is acquired after the release button is pressed, is not interrupted (step S23). That is, the control unit 4 adds the frame image d being generated to the count value i. Meanwhile, when it is determined that the moving image processing is not being executed by the first image processing unit 8 in step S21 (step S21: NO), for example, the release button is pressed by the user at time to illustrated in FIG. 3, the control unit 4 proceeds to next processing without executing processing of steps S22 and S23, because there is no frame image that is being generated and does not need to be deleted.

Next, the control unit 4 executes the processing for capturing the still image (step S24) and the processing necessary for generating the interpolation frame image (step S25) in parallel. Here, the interpolation frame image is the image for interpolating a frame image that missed during the capturing of the still image and is generated when the control unit 4 ends the capturing of the still image and restarts the capturing of the moving image. First, processing (step S24 illustrated in FIG. 4) to capture the still image will be described with reference to the flowchart illustrated in FIG. 5.

First, after a preparation (focusing or exposing) for capturing the still image ends (for example, at time t3 illustrated in FIG. 3), the control unit 4 acquires the image data for the still image based on the image capturing signal output from the image capturing element 6 (step S30) and temporarily stores the acquired image data for the still image in the buffer memory (not illustrated) in the second image processing unit 10. Since the image data is the image data for the still image, all pixels are read from the image capturing element 6. Next, the control unit 4 executes still image processing of the image data for the still image acquired in step S30 in the second image processing unit 10 (step S31). That is, the second image processing unit 10 executes still image processing to generate a still image e (refer to FIG. 3), from the image data based on the image capturing signal from the image capturing element 6, according to an instruction from the control unit 4. Next, the control unit 4 records the still image e on which the still image processing is executed by the second image processing unit 10 in step S31, in the recording medium 12 (step S32).

Next, processing (step S25 illustrated in FIG. 4) that necessary for generating the interpolation frame image will be described with reference to the flowchart illustrated in FIG. 6.

Figure 5:
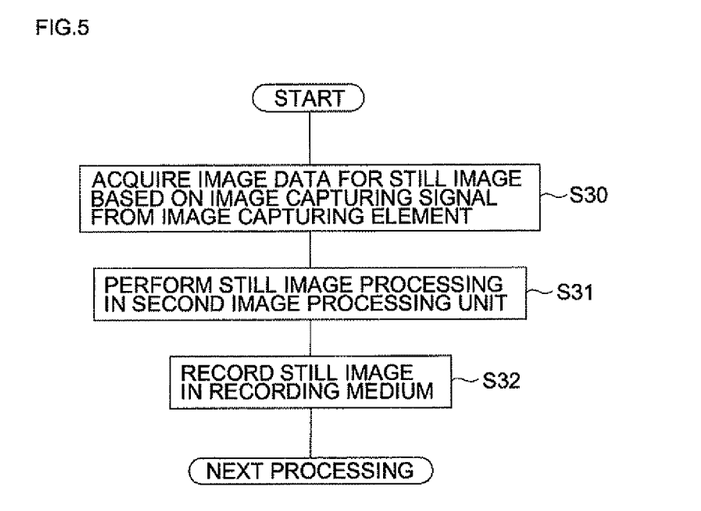
FIG. 5 is a flowchart illustrating processing of when a still image is captured during capturing of a moving image in the electronic camera according to the embodiment.

First, the control unit 4 determines whether the image data for the still image based on the image capturing signal from the image capturing element 6 is acquired, that is, processing of step S30 illustrated in FIG. 5 is executed (step S40). When it is determined that the image data for the still image is not acquired in step S40 (step S40: NO), the control unit 4 determines whether a next moving image cycle is acquired (step S41). When it is determined that the next moving image cycle is acquired in step S41 (step S41: YES, for example, time t2 illustrated in FIG. 3), the control unit 4 adds 1 to the count value i of the first counter 16 (i=1) (step S42). That is, since the first counter 16 is used to count the number of frame images which would be generated if the moving image processing, which is supposed to be interrupted until the image data based on the image capturing signal output from the image capturing element 6 is acquired after the release button is pressed, is not interrupted, the control unit 4 adds 1 to the count value i.

When it is determined that the next moving image cycle is not acquired in step S41 (step S41: NO) and processing of adding 1 to the count value i is executed in step S42, the control unit 4 returns to processing of step S40. The control unit 4 repeats processing of steps S40 to S42 until it is determined that the image data for the still image is acquired in step S40, that is, until processing of step S30 illustrated in FIG. 5 is executed.

When the preparation for capturing the still image ends and it is determined that the image data for the still image based on the image capturing signal from the image capturing element 6 is acquired in step S40 (step S40: YES, for example, time t3 illustrated in FIG. 3), that is, when it is determined that processing of step S30 illustrated in FIG. 5 is executed, the control unit 4 determines whether the still image processing executed by the second image processing unit 10, that is, processing of step S31 illustrated in FIG. 5 ends (step S43).

When it is determined that the still image processing executed by the second image processing unit 10, that is, processing of step S31 illustrated in FIG. 5 does not end in step S43 (step S43: NO), the control unit 4 determines whether a next moving image cycle is acquired (step S44). When it is determined that the next moving image cycle is acquired in step S44 (step 944: YES, for example, time t4 illustrated in FIG. 3), the control unit 4 adds 1 to the count value j of the second counter 18 (j=j+1) (step S45). That is, since the second counter 18 is used to count the number of frame images which would be generated if the moving image processing, which is interrupted until the still image processing executed by the second image processing unit 10 ends after the image data based on the image capturing signal output from the image capturing element 6 is acquired, is not interrupted, the control unit 4 adds 1 to the count value j.

When it is determined that the next moving image cycle is not acquired in step S44 (step S44: NO) and processing of adding 1 to the count value j is executed in step S45, the control unit 4 returns to processing of step S43. The control unit 4 repeats processing of steps S43 to S45 until it is determined that the still image processing executed by the second image processing unit 10 in step S43, that is, processing of step S31 illustrated in FIG. 5 ends.

When it is determined that the still image processing executed by second image processing unit 10 in step S43, that is, processing of step S31 illustrated in FIG. 5 ends (step S43, YES), the control unit 4 maintains a waiting state until the next moving image cycle is acquired (step S46: NO). When the next moving image cycle is acquired (step S46: YES), the control unit 4 returns to processing of step S12 illustrated in FIG. 2 and restarts the interrupted capturing of the moving image.

That is, the control unit 4 acquires the image data based on the image capturing signal output from the image capturing element 6 in synchronization with the moving image cycle (step S12) and executes moving image processing to generate a frame image f (refer to FIG. 3) from the image data acquired in step S12 in the first image processing unit 8 (step S13). The control unit 4 determines whether each of the count values i and j of the first counter 16 and the second counter 18 is 0 (step S14). When it is determined that each of the count values i and j is 0 (step S14: YES), the control unit 4 determines that processing to capture the still image in step S24 illustrated in FIG. 4 (steps S30 to S32 illustrated in FIG. 5) is not executed. When it is determined that each of the count values i and j is not 0 (step S14: NO), the control unit 4 determines that processing to capture the still image in step S24 illustrated in FIG. 4 (steps S30 to S32 illustrated in FIG. 5) is executed.

Figure 6:
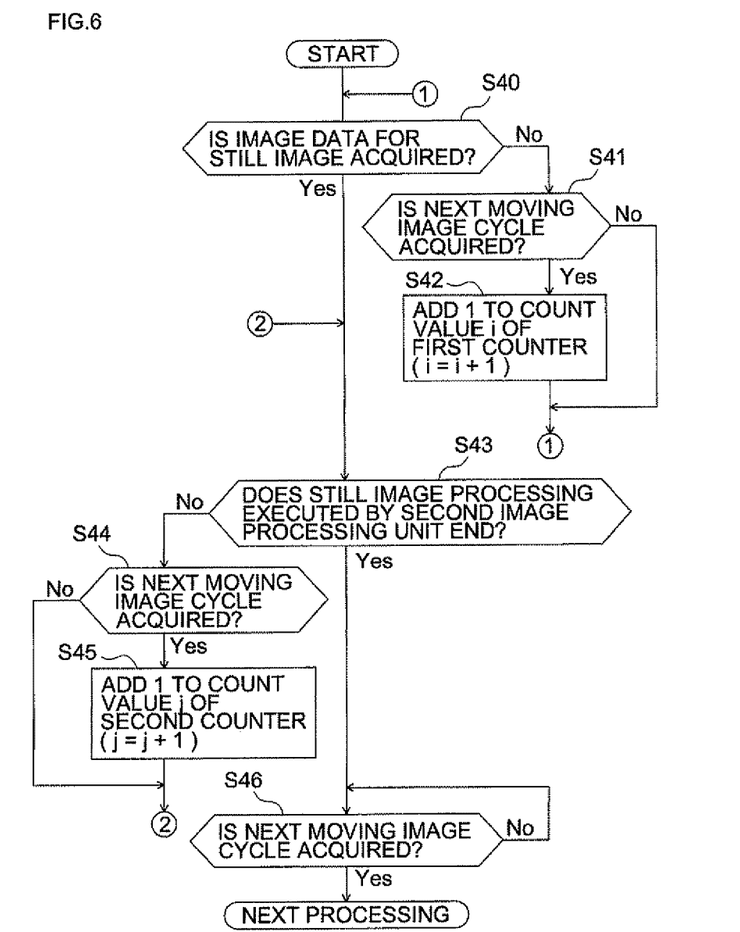
FIG. 6 is a flowchart illustrating processing that is needed to generate an interpolation frame image in the electronic camera according to the embodiment.

Therefore, in this case, since processing of adding 1 to each of the count values i and j in steps S42 and S45 illustrated in FIG. 6 is executed at least once after the still image e (refer to FIG. 3) is captured, the control unit 4 determines that each of the count values i and j is not 0 (step S14: NO) and executes processing to generate an interpolation frame image (step S17). In this case, the interpolation frame image is a pseudo image of the frame image to be missed during capturing of the still image, that is, a frame image which would be generated if the moving image processing, which is interrupted during capturing of the still image e until capturing of the moving image restarts after the release button is pressed (capturing of the still image e is instructed), is not interrupted.

In this embodiment, processing to generate the interpolation frame image in the second image processing unit 10 is executed in parallel with the moving image processing in the first image processing unit 8. In the first image processing unit 8, processing of transmitting information or the like needed to generate the interpolation frame image in the second image processing unit 10 to the second image processing unit 10 is executed in parallel with the moving image processing. First, processing of transmitting the information or the like needed to generate the interpolation frame image in the second image processing unit 10 from the first image processing unit 8 to the second image processing unit 10, which processing is executed in parallel with the moving image processing in the first image processing unit 8, will be described with reference to the flowchart illustrated in FIG. 7.

First, the control unit 4 transmits the frame image (for example, frame image c illustrated in FIG. 3) (hereinafter, referred to as previous frame image) on which the moving image processing is executed by the first image processing unit 8 immediately before time t1 when the release button is pressed and which is temporarily stored in the buffer memory in the first image processing unit 8, to the second image processing unit 10 through the first transmission control unit 20 and the second transmission control unit 22 (step S50). Likewise, the control unit 4 transmits the frame image (for example, frame image f illustrated in FIG. 3) (hereinafter, referred to as following frame image) on which the moving image processing is executed by the first image processing unit 8 immediately after time t5 (refer to FIG. 3) when processing to capture the still image e (refer to FIG. 3) ends, that is, time when the moving image processing restarts and which is temporarily stored in the buffer memory in the first image processing unit 8, to the second image processing unit 10 through the first transmission control unit 20 and the second transmission control unit 22 (step S51).

Next, the control unit 4 acquires an address number of the previous frame image c from the recording medium 12 (step S52). Next, the control unit 4 acquires the count value i from the first counter 16 and the count value j from the second counter 18 (step S53), and executes an offset of the address number on the basis of the count values i and j acquired in step S53 (step S54). That is, since a sum (i+j) of the count values i and j shows the number of frame images which would be generated if the moving image processing interrupted during capturing of the still image e is not interrupted, the control unit 4 executes an offset of the address number, such that the following frame image f is recorded in an address having an address number obtained by adding (i+j+1) to the address number of the previous frame image c. In addresses that have (i+j) address numbers between the address number of the previous frame image c and the address number of the following frame image f, interpolation frame images to be generated thereafter are recorded.

Next, the control unit 4 returns to processing of step S15 illustrated in FIG. 2, after processing of step S54 ends. That is, the control unit 4 records the frame image f in an address having the address number offset in step S54 (address number obtained by adding (i+j+1) to the address number of the previous frame image c) (step S15).

Figure 8:
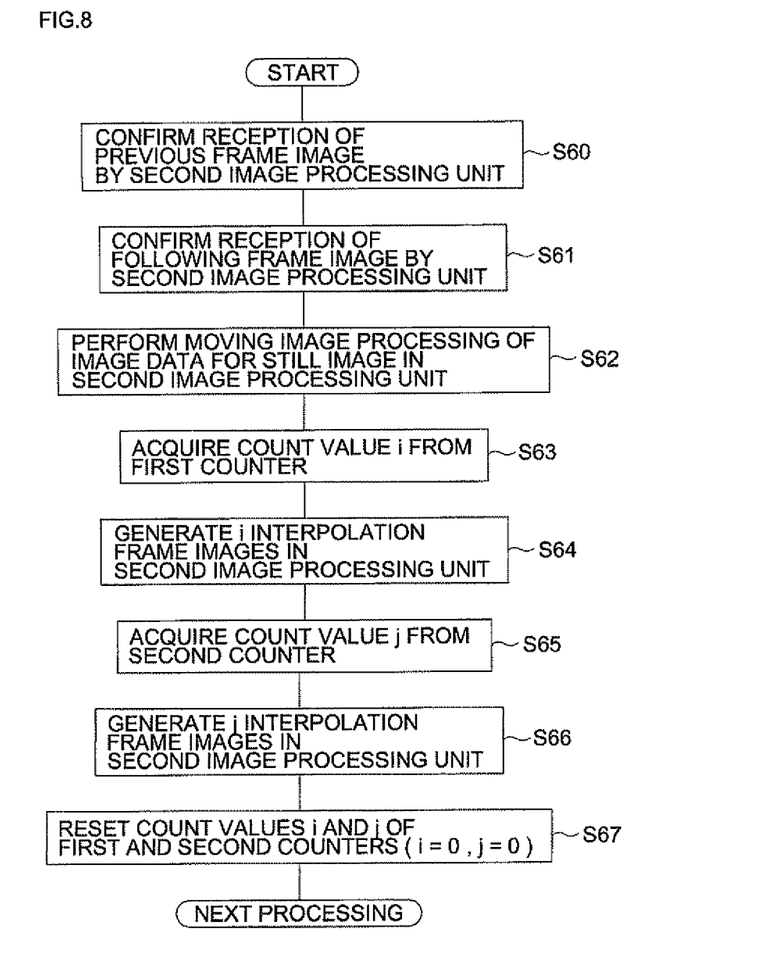
FIG. 8 is a flowchart illustrating processing of when an interpolation frame is generated in the electronic camera according to the embodiment.

Next, processing to generate the interpolation frame image in the second image processing unit 10 that is executed in parallel with the moving image processing in the first image processing unit 8 will be described with reference to the flowchart of FIG. 8.

Figure 7:
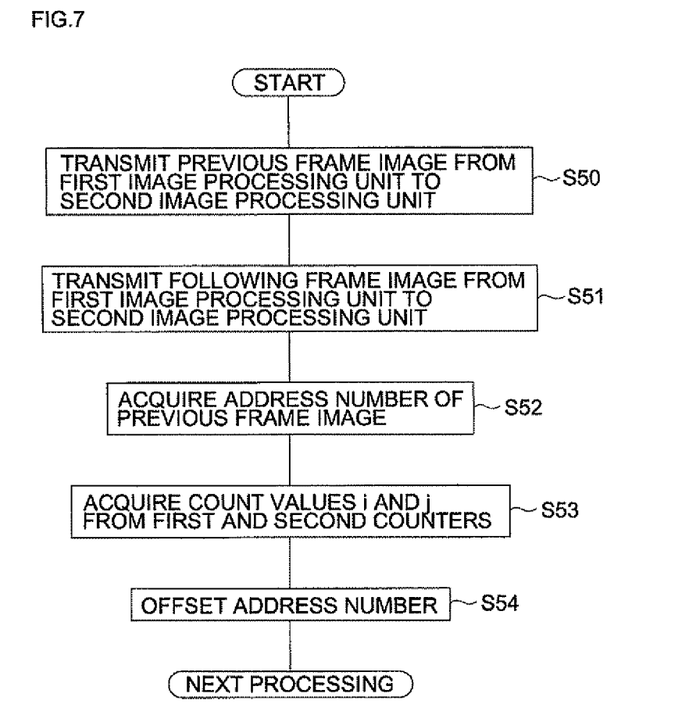
FIG. 7 is a flowchart illustrating processing that is needed to generate an interpolation frame image in the electronic camera according to the embodiment.

First, the control unit 4 confirms whether the second image processing unit 10 receives the previous frame image c transmitted from the first image processing unit 8 to the second image processing unit 10 in step S50 illustrated in FIG. 7 (step S60). Likewise, the control unit 4 confirms whether the second image processing unit 10 receives the following frame image f transmitted from the first image processing unit 8 to the second image processing unit 10 in step S51 illustrated in FIG. 7 (step S61).

Next, the control unit 4 executes the moving image processing of the image data for the still image e acquired in step S30 illustrated in FIG. 5 and temporarily stored in the buffer memory or the like in the second image processing unit 10, in the first image processing unit 8 (step S62). That is, the first image processing unit 8 executes the moving image processing to generate the frame image (hereinafter, referred to as frame image based on the still image e) for the moving image, from the image data for the still image e, according to an instruction from the control unit 4.

Next, the control unit 4 acquires the count value i from the first counter 16 (step S63) and executes processing to generate i interpolation frame images, on the basis of the previous frame image c received by the second image processing unit 10 in step S60 and the frame image based on the still image e generated in step S62 (step S64). The i interpolation frame images are i frame images which would be generated if the moving image processing, which is interrupted until the image data of the still image e based on the image capturing signal output from the image capturing element 6 is acquired from time t1 when the release button is pressed, is not interrupted.

For example, in the case of FIG. 3, since the count value i of the first counter 16 is 2, the second image processing unit 10 generates two interpolation frame images g and h. The interpolation frame images g and h are generated on the basis of a movement vector of the subject calculated from the previous frame image c and the frame image based on the still image e, using a well-known interpolation frame image generating function disclosed in Japanese Patent Application raid-Open No. 2006-94058. In the case of FIG. 3, the interpolation frame image g that is a next frame image of the previous frame image c is generated such that movement of the subject becomes smooth on the basis of a movement vector of the subject calculated from the previous frame image c and the frame image based on the still image e. The interpolation frame image h that is a next frame image of the interpolation frame image g is generated as the same frame image as the frame image based on the still image e, because time when the image data of the frame image corresponding to the interpolation frame image h which would be read if the interrupted moving image processing is not interrupted, and time when the still image e is captured are almost the same.

Next, the control unit 4 acquires the count value j from the second counter 18 (step S65) and executes processing to generate j interpolation frame images, on the basis of the following frame image f received by the second image processing unit 10 in step 961 and the frame image based on the still image e generated in step S63 (step S66). The j interpolation frame images are j frame images which would be generated if the moving image processing, which is interrupted until the still image processing by the second image processing unit 10 ends after the image data for the still image e based on the image capturing signal output from the image capturing element 6 is acquired, is not interrupted.

For example, in the case of FIG. 3, since the count value j of the second counter 18 is 2, the second image processing unit 10 generates two interpolation frame images k and m. The interpolation frame images k and m are also generated in the same way as the interpolation frame images g and h described above. For example, the interpolation frame image k that is a next frame image of the interpolation frame image h is generated on the basis of the movement vector of the subject calculated from the frame image based on the still image e and the following frame image f. Therefore the position of the subject in the interpolation frame image h is the position, weighted to the position of the subject in the still image e more than the position of the subject in the following frame image f. Furthermore the interpolation frame image m that is a next frame image of the interpolation frame image k is generated on the basis of the movement vector of the subject calculated from the frame image based on the still image e and the following frame image f. Therefore the position of the subject in the interpolation frame image k is the position, weighting the position of the subject in the following frame image f more than the position of the subject in the frame image based on the still image e. That is, when the moving subject exists, in steps S64 and S66, the interpolation frame images g, h, k, and m where the position of the subject in the image is different are generated.

Next, the control unit 4 resets the count value i of the first counter 16 and the count value j of the second counter 18, that is, sets the count values to 0 (step S67) and proceeds to processing of step S15 illustrated in FIG. 2. That is, the control unit 4 records the interpolation frame images g, h, k, and m generated by the second image processing unit 10 in steps S64 and S66 illustrated in FIG. 8, in the recording medium 12 (step S15). Specifically, the control unit 4 acquires an address number of the previous frame image c from the recording medium 12 and records the interpolation frame image g in an address having a next address number (for example, n+3) of the address number (for example, n+2) of the previous frame image c. Likewise, the control unit 4 sequentially records the interpolation frame image h in an address having a next address number (for example, n+4), the interpolation frame image k in an address having a next address number (for example, n+5), and records the interpolation frame m in an address having a next address number (for example, n+6).

The control unit 4 repeats the above-described processing until it is determined that the end of capturing of the moving image is instructed in step S16, for example, generation and recording processing of the frame images p to s by the first image processing unit 8 illustrated in FIG. 3. When it is determined that the end of capturing of the moving image is instructed in step S16 (step S16: YES), the control unit 4 ends capturing of the moving image, that is, generation and recording of a moving image file that is constituted by the frame images a to c, f, p to s, . . . on which the moving image processing is executed by the first image processing unit 8 and the interpolation frame images g, h, k, and m which are generated by the second image processing unit 10.

Figure 9:
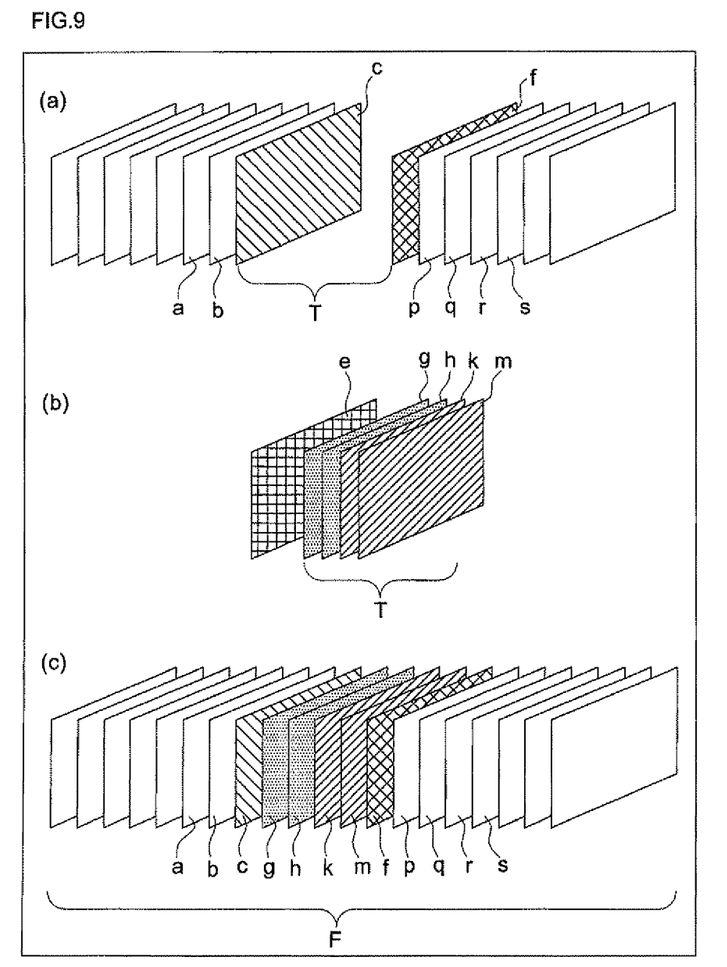
FIG. 9 is a diagram illustrating a frame image generated by a first image processing unit, a still image and an interpolation frame image generated by a second image processing unit, and frame images that form a moving image file.

As such, by executing processing illustrated in the flowcharts of FIGS. 2 to 8, for example, as illustrated in FIG. 9A, first, the frame images a to c to form the moving image file are generated in the first image processing unit 8. If capturing of the still image is instructed, the still image e is generated in the second image processing unit 10, as illustrated in FIG. 9B. If processing of capturing of the still image ends, as illustrated in FIG. 9A, the frame images f, p to s, . . . to form the moving image file are sequentially generated in the first image processing unit 8. In parallel with this processing, as illustrated in FIG. 9B, the interpolation frame images g, h, k, and m (frame images missed during a period T in which the still image e is generated in the second image processing unit 10) are generated in the second image processing unit 10. As illustrated in FIG. 9C, the frame images a to c, f, p to s, . . . and the interpolation frame images g, h, k, and m are sequentially stored in addresses having predetermined address numbers, and the moving image file F is generated and recorded in the recording medium 12.

According to the electronic camera 2 of the embodiment, since the two image processing units to execute image processing on the image data are included, capturing of the moving image restarts after the still image is captured during capturing of the moving image, and then the interpolation frame image that is the frame image missed during capturing of the still image can be easily generated with high precision during capturing of the moving image. For example, in the electronic camera according to the related art that includes the two image processing units, the frame images having odd numbers are processed by one image processing unit and the frame images having even numbers are processed by the other image processing unit, whereby high-speed continuous capturing is realized. That is, by using the electronic camera including the two image processing units, the moving image processing is executed by one image processing unit and the interpolation frame image generating processing is executed by the other image processing unit. As a result, even when the still image is captured during capturing of the moving image, the moving image file can be generated in real time. Since the interpolation frame images are generated on the basis of the frame images generated before and after capturing of the still image and the frame image based on the still image, there can be reproduced a moving image that can smoothly move without unnatural stop of movement of the subject of the portion corresponding to the interpolation frame images, when the moving image including the interpolation frame images is reproduced.

In the embodiment described above, the two counters 16 and 18 are used to count the number of frame images until the image capturing signal for the still image is acquired from the image capturing element 6 after the capturing of the still image is instructed and the number of frame images until capturing of the moving image restarts after the image capturing signal for the still image is acquired from the image capturing element 6. However, one counter may be used to count the number of frame images. In this case, first, the number of frame images until the image capturing signal for the still image is acquired from the image capturing element 6 after capturing of the still image is instructed is counted using one counter. Next, the count result (count value i in the embodiment described above) is stored in the buffer memory (not illustrated) or the like and the number of frame images is continuously counted by the counter until capturing of the moving image restarts. By subtracting the count result (count value i) stored in the buffer memory from the obtained count result (count value (i+j) in the embodiment described above), the number of frame images (count value j in the embodiment described above) until capturing of the moving image restarts after the image capturing signal for the still image is acquired from the image capturing element 6 is calculated. The number of frame images until the image capturing signal for the still image is acquired from the image capturing element 6 after capturing of the still image is instructed is the count result (count value i) that is stored in the buffer memory or the like.

In the embodiment described above, the case where the still image e is a single image to be captured has been described. However, the present invention can be applied to the case where the still images captured during capturing of the moving image are plural images to be continuously captured. In this case, the frame image based on each of the images to be continuously captured is generated (step S62 illustrated in FIG. 8) and the interpolation frame image is generated on the basis of each of the frame images based on the images to be continuously captured, the previous frame image, and the following frame image. For example, on the basis of the previous frame image and the frame image based on the first image to be continuously captured, the interpolation frame image therebetween is generated. On the basis of the frame images based on the second and third images, the third and fourth images, and so on to be continuously captured, the interpolation frame images therebetween are sequentially generated. On the basis of the frame image based on the final image to be continuously captured and the following frame image, the interpolation frame image therebetween is generated.

In the embodiment described above, the interpolation frame image is generated on the basis of the frame image c immediately before capturing of the still image e is instructed and the frame image f immediately after capturing of the moving image restarts. However, the interpolation frame image may be generated, on the basis of the frame image (for example, frame image b illustrated in FIG. 3) before capturing of the still image e is instructed, instead of the frame image c or in addition to the frame image c. The interpolation frame image may be generated, on the basis of the frame image (for example, frame image p illustrated in FIG. 3) after capturing of the moving image restarts, instead of the frame image f or in addition to the frame image f.

The embodiment described above has been described for easy understanding of the present invention and does not limit the present invention. Therefore, the elements that are disclosed in the embodiment include all of design changes or equivalents within a technical range of the present invention.

The invention claimed is:

1. An image capturing device, comprising:
an image capturing element that captures an image of light from a subject;
a first image processing unit that processes a plurality of frame images to form a moving image file, on the basis of an image capturing signal from the image capturing element;
an instructing unit that instructs to capture a still image of the subject;
a second image processing unit that processes the still image on the basis of the image capturing signal from the image capturing element, wherein
when the instructing unit instructs to capture the still image during capturing of the moving image, the second image processing unit processes the still image and then generates an interpolation frame image, which is the frame image until the capturing of the moving image restarts after the instructing unit instructs to capture the still image, while the first image processing unit simultaneously performs the capturing of the moving image that is restarted immediately after the still image is captured; and
a moving image file generating unit that generates the moving image file, on the basis of the plurality of frame images processed by the first image processing unit and the interpolation frame image generated by the second image processing unit.

2. The image capturing device of claim 1,
wherein, when the instructing unit instructs to capture the still image, the first image processing unit stops processing of the frame images, and
when the capturing of the still image ends, the first image processing unit restarts processing of the frame images and the second image processing unit starts generation of the interpolation frame image at the same time as restarting of the image processing by the first image processing unit.

3. The image capturing device of claim 1,
wherein the first image processing unit includes a transmitting unit that transmits the frame images to the second image processing unit,
the second image processing unit includes a receiving unit that receives the frame images transmitted from the transmitting unit, the transmitting unit transmits a previous frame image which is the frame image processed by the first image processing unit before the instructing unit instructs to capture the still image and a following frame image which is the frame image processed by the first image processing unit after the still image is captured and the capturing of the moving image restarts, to the second image processing unit, the receiving unit receives the previous frame image and the following frame image that are transmitted by the transmitting unit, and the second image processing unit generates the frame image based on the still image, and generates the interpolation frame image, on the basis of at least two frame images of the previous frame image received by the receiving unit, the frame image based on the generated still image, and the following frame image received by the receiving unit.

4. The image capturing device of claim 3, wherein the previous frame image is the frame image processed by the first image processing unit immediately before the instructing unit instructs to capture the still image, and the following frame image is the frame image processed by the first image processing unit immediately after the capturing of the moving image restarts.

5. The image capturing device of claim 1, further comprising:

a first detecting unit that detects the number of the frame images until the second image processing unit acquires the image capturing signal from the image capturing element after the instructing unit instructs to capture the still image; and a second detecting unit that detects the number of the frame images until the capturing of the moving image restarts after the second image processing unit acquires the image capturing signal from the image capturing element, wherein the second image processing unit generates the interpolation frame image, on the basis of detection results from the first and second detecting units.

6. The image capturing device of claim 5, wherein the second image processing unit generates the interpolation frame images of the number detected by the first detecting unit, on the basis of the previous frame image and the frame image based on the still image, and generates the interpolation frame images of the number detected by the second detecting unit, on the basis of the frame image based on the still image and the following frame image.

7. The image capturing device of claim 3, wherein the still image includes a plurality of images continuously captured, and the second image processing unit generates the frame image based on each of the continuously captured images.

8. An image capturing device, comprising:

an image capturing element that captures an image of light from a subject;

a first image processing unit that processes a plurality of frame images to form a moving image file, on the basis of an image capturing signal from the image capturing element;

an instructing unit that instructs to capture a still image of the subject;

a second image processing unit that processes the still image on the basis of the image capturing signal from the image capturing element, when the instructing unit instructs to capture the still image during capturing of the moving image, and generates an interpolation frame image which is the frame image until the capturing of the moving image restarts after the instructing unit instructs to capture the still image;

a first detecting unit that detects the number of the frame images until the second image processing unit acquires the image capturing signal from the image capturing element after the instructing unit instructs to capture the still image;

a second detecting unit that detects the number of the frame images until the capturing of the moving image restarts after the second image processing unit acquires the image capturing signal from the image capturing element; and a moving image file generating unit that generates the moving image file, on the basis of the plurality of frame images processed by the first image processing unit and the interpolation frame image generated by the second image processing unit, wherein the second image processing unit generates the interpolation frame image, on the basis of detection results from the first and second detecting units.

9. An image capturing device, comprising:

an image capturing element that captures an image of light from a subject;

a first image processing unit that processes a plurality of frame images to form a moving image file, on the basis of an image capturing signal from the image capturing element;

an instructing unit that instructs to capture a still image of the subject;

a second image processing unit that processes the still image on the basis of the image capturing signal from the image capturing element, when the instructing unit instructs to capture the still image during capturing of the moving image, and generates an interpolation frame image which is the frame image until the capturing of the moving image restarts after the instructing unit instructs to capture the still image; and a moving image file generating unit that generates the moving image file, on the basis of the plurality of frame images processed by the first image processing unit and the interpolation frame image generated by the second image processing unit, wherein the still image includes a plurality of images continuously captured, and the second image processing unit generates the frame image based on each of the continuously captured images.

10. The image capturing device of claim 9, wherein the second image processing unit generates the interpolation frame image, while the first image processing unit simultaneously performs the capturing of the moving image restarted immediately after the still image is captured.

* * * * *